W. V. TURNER.
LUBRICATOR FOR AIR PUMPS.
APPLICATION FILED APR. 19, 1911.
1,045,462.
Patented Nov. 26, 1912.
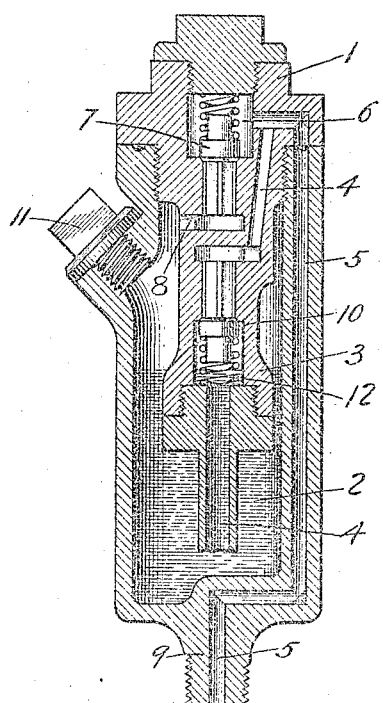
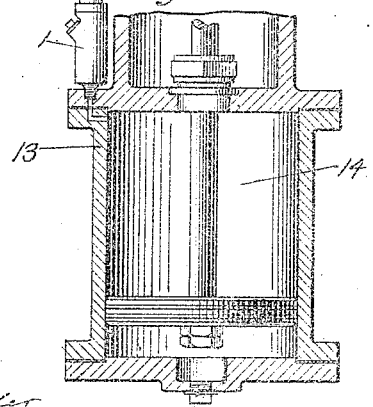
WITNESSES
INVENTOR
Walter V. Turner

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

LUBRICATOR FOR AIR-PUMPS.

1,045,462.  Specification of Letters Patent.  Patented Nov. 26, 1912.

Application filed April 19, 1911. Serial No. 622,084.

*To all whom it may concern:*

Be it known that I, WALTER V. TURNER, a citizen of the United States, residing at Edgewood, in the county of Allegheny and State of Pennsylvania, have invented new and useful Improvements in Lubricators for Air-Pumps, of which the following is a specification.

This invention relates to lubricating devices, and more particularly to a lubricating device for fluid compressors. Heretofore, with lubricators for feeding oil to the air cylinder of an air compressor, especially where oil is supplied to the cylinder at each stroke of the pump, considerable difficulty has been experienced in preventing an excessive amount of oil from being supplied.

The principal object of my invention is to provide an improved lubricating device for air pumps which is adapted to feed oil at each stroke of the pump and yet in such small quantity as to prevent an excessive amount of oil from being fed, thus effecting a considerable saving of oil while at the same time sufficiently lubricating the pump.

In the accompanying drawing, Figure 1 is a central sectional view of a lubricating device embodying my invention and Fig. 2 a sectional view of an air pump with the lubricator applied thereto.

According to the construction illustrated in the drawing, a suitable casing 1 is provided having an oil chamber 2 adapted to contain a supply of oil or lubricant and depending into said chamber is a plug 3 provided with a passage 4. The passage 4 extends upwardly through the plug 3 and connects with a passage 5 located in the wall of the casing 1 and a check valve 10 is mounted in said passage 4 so as to prevent flow through passage 4 in the direction from the oil chamber 2 to the passage 5 but adapted to permit flow in the opposite direction. Passage 5 also communicates with a chamber 6 in the plug 3 containing a check valve 7 adapted to permit flow from a passage 8, opening into the oil chamber 2, to the passage 5 but preventing flow in the opposite direction. The passage 8 opens into the oil chamber 2 at a point near the top of same so as to be above the surface of the oil contained in the chamber. Passage 5 leads out through a lower threaded projection 9 of the casing 1, so that the lubricator may be screwed into the casing 13 of an air cylinder 14 of a pump and communication thus established from the air cylinder to said passage, as shown in Fig. 2.

In operation, the oil chamber 2 having been filled about one-half or two-thirds full of oil or lubricant, upon a compression stroke of the pump, air is forced from the air cylinder through passage 5 and thence, by lifting the check valve 10 from its seat against spring 12, flows out of passage 4 into the oil chamber 2. The air then rises up in bubbles through the body of oil in said chamber and in so doing becomes charged to a certain extent with oil vapor, so that the air space in the chamber 2 above the body of oil contains oil charged air. In a suction stroke of the pump, the pressure of air in chamber 2 causes the check valve 7 to lift from its seat and the oil charged air then flows through passage 5 into the air cylinder of the pump. It will now be evident that the quantity of oil entrained with the air is comparatively small and consequently only a very little oil is supplied to the pump on each suction stroke, thus preventing waste of oil and excessive lubrication of the pump.

A screw plug 11 may be provided in the casing 1, so that the chamber 2 may be charged with oil through the inlet provided by removing the plug.

Having now described my invention, what I claim as new and desire to secure by Letters Patent, is:

1. A lubricator for air pumps comprising a casing having a chamber containing a body of lubricant and means for conducting air from the pump through said lubricant on the compression stroke of the pump and for discharging said air into the pump on the suction stroke of the pump.

2. A lubricator for air pumps comprising a casing having a chamber containing a body of oil, means for conducting air compressed by the pump on its compression stroke through the oil to thereby entrain oil in the air, and means for discharging the oil entrained air into the pump to thereby lubricate the same.

3. The combination with an air pump provided with an air cylinder, of a lubricator for said pump having a chamber containing a body of oil, a passage communicating with said air cylinder for discharging fluid compressed by the pump into said oil, and a passage communicating with said chamber for discharging fluid passed through said oil into the air cylinder of the pump.

4. The combination with an air pump provided with an air cylinder, of a lubricator for said pump comprising a casing having a chamber containing a body of oil, a passage leading from said cylinder and having its outlet in the body of oil for discharging air compressed by the pump on its compression stroke through said oil, and having another passage leading from said oil chamber for supplying air passed through the oil to the air cylinder of the pump.

5. The combination with an air pump provided with an air cylinder, of a lubricator for said pump comprising a casing having a chamber containing a body of oil, a passage leading from said cylinder and having its outlet in the body of oil for discharging air compressed by the pump on its compression stroke through said oil, and having another passage leading from said oil chamber for supplying air passed through the oil to the air cylinder of the pump and a check valve in each passage.

6. The combination with an air pump provided with an air cylinder, of a lubricator for said pump comprising a casing having a chamber containing a body of oil, a passage leading from said cylinder and having its outlet in the body of oil for discharging air compressed by the pump on its compression stroke through said oil, and having another passage leading from said oil chamber for supplying air passed through the oil to the air cylinder of the pump on the suction stroke of the pump, a check valve in the compression passage for closing communication from the oil chamber toward the air cylinder, and a check valve in the suction passage for closing communication from the air cylinder toward the chamber.

7. The combination with an air pump provided with an air cylinder, of a lubricator for said pump comprising a casing having a chamber containing a body of oil, a passage leading from said cylinder and having its outlet in the body of oil for discharging air compressed by the pump on its compression stroke through said oil, and having another passage leading from said oil chamber for supplying air passed through the oil to the air cylinder of the pump on the suction stroke of the pump, and a non-return check valve in each passage.

In testimony whereof I have hereunto set my hand.

WALTER V. TURNER.

Witnesses:
A. M. CLEMENTS,
S. W. KEEFER.